(12) United States Patent
Tai et al.

(10) Patent No.: US 8,556,572 B2
(45) Date of Patent: Oct. 15, 2013

(54) WIND POWER TURBINE

(75) Inventors: Chang-Hsien Tai, Kaohsiung (TW);
Uzu-Kuei Hsu, Kaohsiung County (TW)

(73) Assignee: National Pingtung University of Science & Technology, Pingtung County (TW)

( * ) Notice: Subject to any disclaimer, the term of this patent is extended or adjusted under 35 U.S.C. 154(b) by 550 days.

(21) Appl. No.: 12/906,684

(22) Filed: Oct. 18, 2010

(65) Prior Publication Data
US 2011/0097200 A1   Apr. 28, 2011

(30) Foreign Application Priority Data

Oct. 28, 2009 (TW) ................................ 98219906 U

(51) Int. Cl.
*F03D 3/02* (2006.01)

(52) U.S. Cl.
USPC .............................. 415/4.4; 416/124; 416/175

(58) Field of Classification Search
USPC ............ 415/4.2, 4.4, 907; 416/124, 126, 175, 416/197 A, 203, DIG. 4; 290/44, 55
See application file for complete search history.

(56) References Cited

U.S. PATENT DOCUMENTS

| | | | |
|---|---|---|---|
| 4,285,636 A | 8/1981 | Kato et al. | |
| 4,834,610 A * | 5/1989 | Bond, III | 415/53.3 |
| 6,666,650 B1 * | 12/2003 | Themel | 416/200 R |
| D511,495 S | 11/2005 | Okubo et al. | |
| 7,132,760 B2 * | 11/2006 | Becker | 290/55 |
| 7,504,740 B2 | 3/2009 | Murakami et al. | |
| 2002/0047276 A1 * | 4/2002 | Elder | 290/55 |
| 2004/0047732 A1 * | 3/2004 | Sikes | 416/1 |
| 2009/0220342 A1 * | 9/2009 | Wu et al. | 416/124 |

FOREIGN PATENT DOCUMENTS

| | | | |
|---|---|---|---|
| EP | 0482514 | * | 4/1992 |
| JP | 2007-40276 | * | 2/2007 |

OTHER PUBLICATIONS

Hashizume, Wind Turbine for Darrieus-Savonius Wind Power, Feb. 15, 2007, Abstract of JP 2007-40276.*

* cited by examiner

*Primary Examiner* — Edward Look
*Assistant Examiner* — Liam McDowell
(74) *Attorney, Agent, or Firm* — Muncy, Geissler, Olds & Lowe, PLLC

(57) ABSTRACT

A wind power turbine includes a frame, a drag-type fan unit and a lift-type fan unit. The frame has a base, a shaft, an electricity generator and a plurality of air-guiding plates. The air-guiding plates are disposed on the base, and the shaft has one end connected to the electricity generator. The drag-type fan unit has a plurality of drag-type blades coupled to an outer circumference of the shaft. The lift-type fan unit has a plurality of lift-type blades disposed around the drag-type blades. Each of the air-guiding plates has a first side and a second side, and the first and second sides are parallel to the shaft. An air inlet is formed between the first sides of adjacent two of the air-guiding plates, and an air outlet is formed between the second sides of adjacent two of the air-guiding plates. The air inlet is larger than the air outlet.

18 Claims, 4 Drawing Sheets

WIND POWER TURBINE

BACKGROUND OF THE INVENTION

1. Field of the Invention

The present invention generally relates to a wind power turbine and, more particularly, to a wind power turbine having both drag-type and lift-type blades for improving electricity generating efficiency thereof.

2. Description of the Related Art

There are two types of blades for wind power turbines based on different operation manners of the blades, such as drag type and lift type. The drag-type blades have smaller starting torque, which makes it easy to drive the blades to rotate when in a slow wind speed but results in lower wind power conversion rate when in a fast wind speed. In contrast, the lift-type blades have larger starting torque when in the slow wind speed, but have better electricity generating efficiency when in the fast wind speed. Thus, based on a combination of both types of blades, the drag-type blades may drive the life-type blades to rotate when in the slow wind speed and the lift-type blades may improve the wind power conversion rate for better electricity generating efficiency when in the fast wind speed.

FIG. 1 shows a conventional wind power turbine having both the drag-type and lift-type blades. The wind power turbine includes a drag-type fan 7, a lift-type fan 8 and a base 9. The drag-type fan 7 has a shaft 71 having a plurality of drag-type blades 72 coupled to an outer circumference of the shaft 71. The lift-type fan 8 has a plurality of lift-type blades 81 connected to the shaft 71 via a plurality of connection members 82. In this way, the drag-type fan 7 and the lift-type fan 8 may rotate in a synchronous manner. The base 9 has an electricity generator 91 which includes a rotor and a stator (not shown), with one end of the shaft 71 being rotatably coupled with the base 9 and connected to the electricity generator 91. Thus, the base 9 may support the drag-type fan 7 and the lift-type fan 8 for rotation. Based on this, when the wind drives the drag-type fan 7 and the lift-type fan 8 to rotate, the rotor of the electricity generator 91 may rotate synchronously with the shaft 71, allowing electricity to be generated due to magnetic induction between the rotor and the stator of the electricity generator 91. Thus, electricity generation by wind power is achieved.

However, each drag-type blade 72 has a windward face and a leeward face. When a forward rotation torque is generated as the wind blows over the windward face of one drag-type blade 72, a reversed rotation torque is simultaneously generated as the wind also blows over the leeward face of the other drag-type blade 72. As a result, the reversed rotation torque may offset a portion of the forward rotation torque, leading to a lower wind power conversion rate. Thus, electricity generating efficiency of the electricity generator 91 is impacted.

For the lift-type blades 81, a rotation torque is generated due to a difference in the speed of wind passing through the inner and outer faces of the lift-type blades 81. However, the lift-type blade 81 is usually in the form of a plate with even thickness or in the form of a cambered plate. Alternatively, the lift-type blade 81 may have a drip-like cross section. These forms of the lift-type blade 81 appear to have a symmetric pattern, resulting in a small difference in the speed of wind passing through the inner and outer faces of the lift-type blades 81. Thus, electricity generation efficiency by wind power is low.

SUMMARY OF THE INVENTION

It is therefore the primary objective of this invention to provide a wind power turbine which improves the wind power conversion rate by using a plurality of air-guiding plates that concentrate the wind on windward faces of drag-type blades for increasing a forward rotation torque and reducing a reversed rotation torque of the drag-type blades.

It is therefore the other objective of this invention to provide a wind power turbine having a plurality of lift-type blades, each having an asymmetric airfoil cross section. Thus, larger speed difference of wind passing through the inner and outer faces of the lift-type blades is achieved for improving electricity generating efficiency of the wind power turbine.

The invention discloses a wind power turbine including a frame, a drag-type fan unit and a lift-type fan unit. The frame has a base, a shaft, an electricity generator and a plurality of air-guiding plates, wherein the air-guiding plates are disposed on the base, the electricity generator is supported by the base and the shaft has one end connected to the electricity generator. The drag-type fan unit has a plurality of drag-type blades coupled to an outer circumference of the shaft. The lift-type fan unit has a plurality of lift-type blades disposed around the drag-type blades, wherein the lift-type blades are coupled to the other end of the shaft. The drag-type blades are surrounded by the air-guiding plates. Each of the air-guiding plates has a first side and a second side, and the first and second sides are parallel to the shaft. An air inlet is formed between the first sides of adjacent two of the air-guiding plates, and an air outlet is formed between the second sides of adjacent two of the air-guiding plates. The air inlet is larger than the air outlet.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

Figure 1:
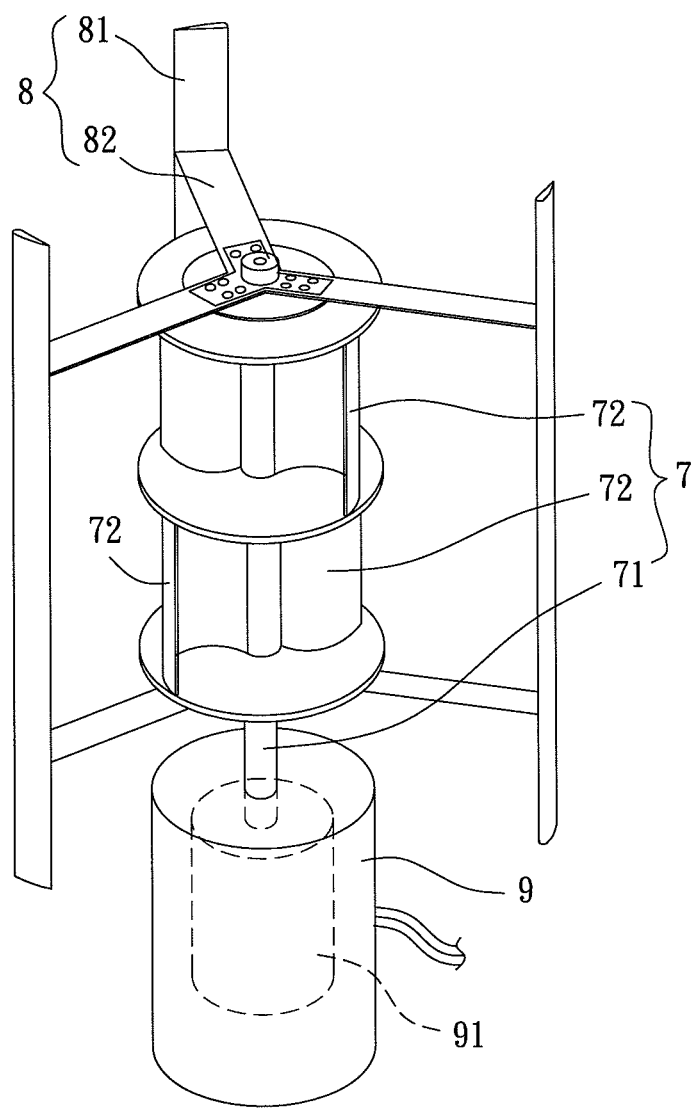
FIG. 1 shows a conventional wind power turbine.

In the various figures of the drawings, the same numerals designate the same or similar parts. Furthermore, when the term "first", "second", "third", "fourth", "inner", "outer" "top", "bottom" and similar terms are used hereinafter, it should be understood that these terms refer only to the structure shown in the drawings as it would appear to a person viewing the drawings and are utilized only to facilitate describing the invention.

DETAILED DESCRIPTION OF THE INVENTION

Figure 2:
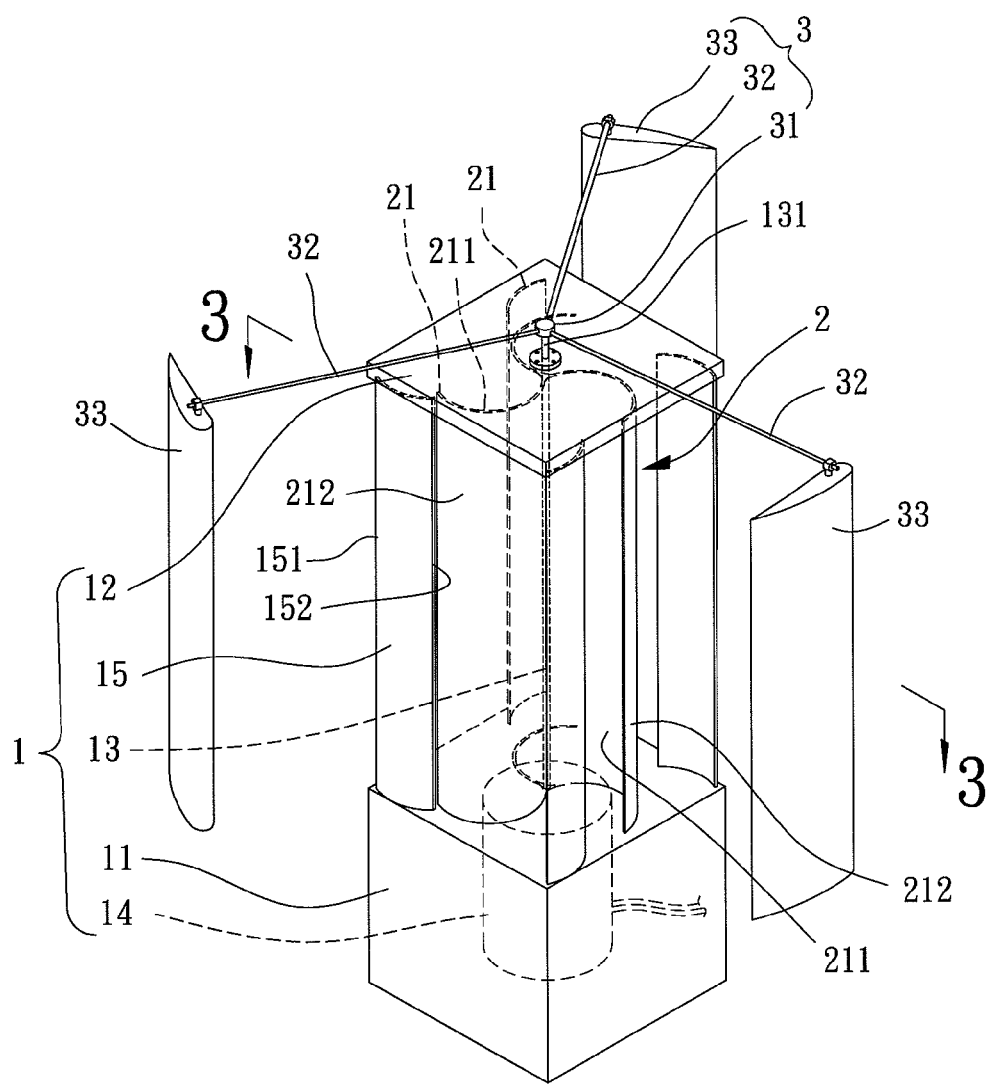
FIG. 2 shows a wind power turbine according to a preferred embodiment of the invention.
Figure 3:
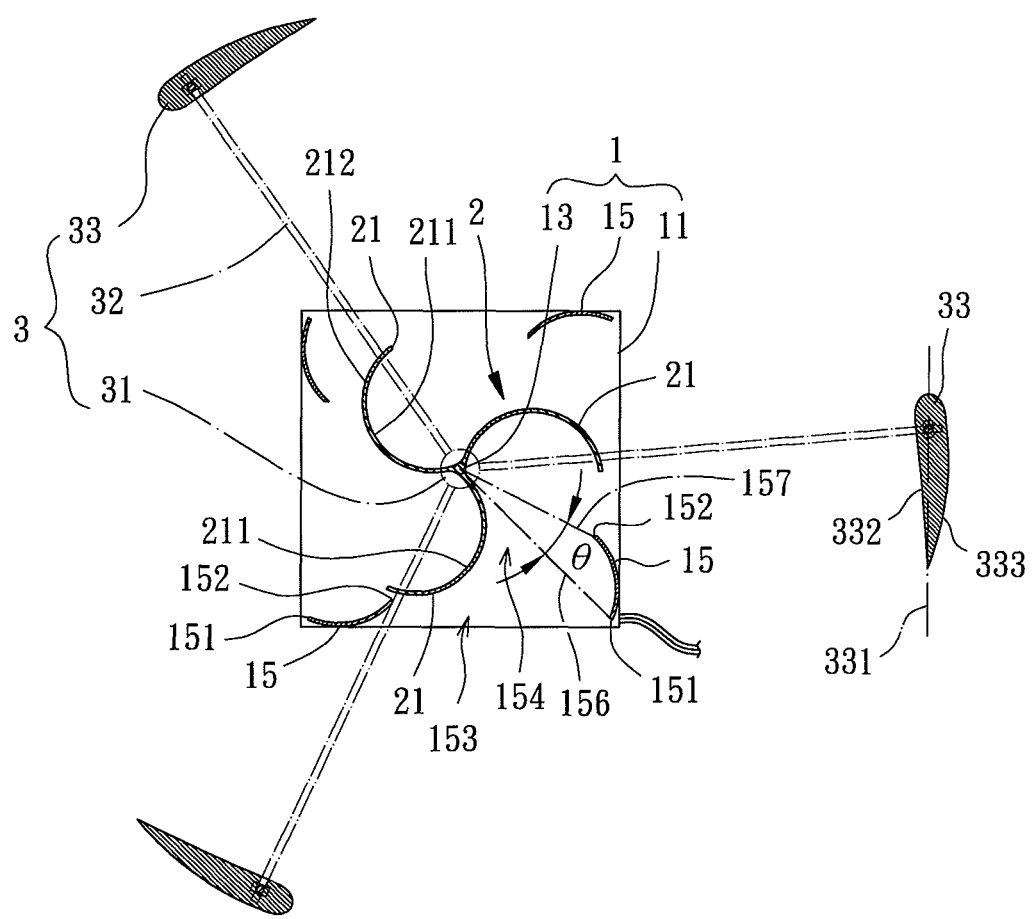
FIG. 3 shows a top cross-sectional view of the wind power turbine observed at line 3-3 according to the preferred embodiment of the invention.

Referring to FIGS. 2 and 3, a wind power turbine including a frame 1, a drag-type fan unit 2 and a lift-type fan unit 3 is disclosed according to a preferred embodiment of the embodiment. The frame 1 includes a shaft 13, with the drag-type fan unit 2 being disposed on an outer circumference of the shaft 13. The shaft 13 has one end connected to an electricity generator 14 having a rotor and a stator (not shown). The lift-type fan unit 3 is disposed around the drag-type fan unit 2 and has one end connected to the other end of the shaft 13, allowing synchronous rotation between the drag-type fan unit 2 and the lift-type fan unit 3. Based on this, electricity power is generated by the electricity generator 14 when the wind blows over the drag-type fan unit 2 and the lift-type fan unit 3.

The frame 1 further includes a base 11, a top plate 12 and a plurality of air-guiding plates 15. Two ends of the shaft 13 are rotatably coupled with the base 11 and the top plate 12, respectively. The electricity generator 14 is disposed in the base 11. The end of the shaft 13, which is coupled with the base 11, extends into the base 11 and connects with the electricity generator 14. The other end of the shaft 13, which is coupled with the top plate 12, extends through the top plate 12 to form an assembling portion 131. The air-guiding plates 15 are disposed between the base 11 and the top plate 12. Preferably, the air-guiding plates 15 are disposed at the corners of the space between the base 11 and the top plate 12.

The air-guiding plates 15 may be in the form of a flat plate or a cambered plate, with the cambered plate being the case in the embodiment. Each air-guiding plate 15 has a first side 151 and a second side 152. The first side 151 and the second side 152 are both parallel to the shaft 13. An air inlet 153 is formed between any two adjacent first sides 151 of two air-guiding plates 15, whereas an air outlet 154 is formed between any two adjacent second sides 152 of two air-guiding plates 15. The air inlet 153 is larger than the air outlet 154.

A virtual plane may be defined between a center of the shaft 13 and the first side 151 of any air-guiding plate 15, namely, the first plane 156. In addition, the other virtual plane may be defined between the center of the shaft 13 and the second side 152 of any air-guiding plate 15, namely, the second plane 157. An included angle θ is formed between the first plane 156 and the second plane 157. The included angle θ is preferably between 10 to 30 degrees, with 20 degrees being more preferable. Furthermore, the distance between the first side 151 and the shaft 13 is greater than that between the second side 152 and the shaft 13.

The drag-type fan unit 2 includes a plurality of drag-type blades 21 coupled to the outer circumference of the shaft 13. The drag-type blades 21 are disposed between the base 11 and the top plate 12, with the air-guiding plates 15 surrounding the drag-type blades 21. Each drag-type blade 21 has a windward face 211 and a leeward face 212. The windward face 211 is preferably a cambered concave face, whereas the leeward face 212 is preferably a cambered convex face. Moreover, the windward face 211 of one drag-type blade 21 faces the leeward face 212 of another adjacent drag-type blade 21.

The lift-type fan unit 3 includes a fixing member 31, a plurality of supporting rods 32 and a plurality of lift-type blades 33. The fixing member 31 is coupled with the assembling portion 131 of the shaft 13. Each supporting rod 32 has one end coupled with an outer circumference of the fixing member 31, and extends outwards from the fixing member 31 in a radial direction. The lift-type blades 33 are coupled with the other ends of the supporting rods 32. Each lift-type blade 33 has a central line 331 extending therethrough in the radial direction, with the central line 331 being preferably perpendicular to the supporting rod 32. The central line 331 splits the lift-type blade 33 into an inner face 332 and an outer face 333, with the inner face 332 facing the shaft 13. Both the inner face 332 and outer face 333 are designed to be cambered in a way that a maximal radial distance from the shaft 13 to the outer face 333 is larger than a maximal radial distance from the shaft 13 to the inner face 332, which presents an asymmetry between the inner face 332 and the outer face 333.

A speedometer and an adjustment device (not shown) may be disposed between the supporting rods 32 and the shaft 13. The speedometer may monitor the rotation speed of the shaft 13, and the adjustment device may adjust the distance to which the supporting rods 32 extend outwards from the shaft 13. The adjustment device may extend the supporting rods 32 to a maximal extent when the wind speed is at a middle level or below, enabling a maximal rotation torque to be generated for best wind power conversion rate. In a case where the wind speed is at a high level or an instant strong wind occurs, if the speedometer detects that the shaft 13 has already achieved a rotational speed higher than a maximal rotational speed of the electricity generator 14, the adjustment device may shorten the length of the supporting rods 32 to lower the rotation torque. Meanwhile, the adjustment device also lowers the rotational speed of the shaft 13, preventing the electricity generator 14 from being damaged due to a high rotational speed. Since usage of the speedometer and the adjustment device is well known in this art, their detailed structures and the way they are connected to the shaft 13 and the supporting rods 32 are not described herein for brevity.

When the proposed wind power turbine is in operation, the wind power turbine may be driven to generate electricity power by wind from all directions rather than only certain directions. When the wind blows over the drag-type fan unit 2 and the lift-type fan unit 3, the drag-type fan unit 2 and the lift-type fan unit 3 will rotate synchronously with the shaft 13, and the rotor of the electricity generator 14 also synchronously rotates with the shaft 13. Thus, electricity power is generated due to magnetic induction between the rotor and the stator of the electricity generator 14, thereby achieving electricity power generation.

Figure 4:
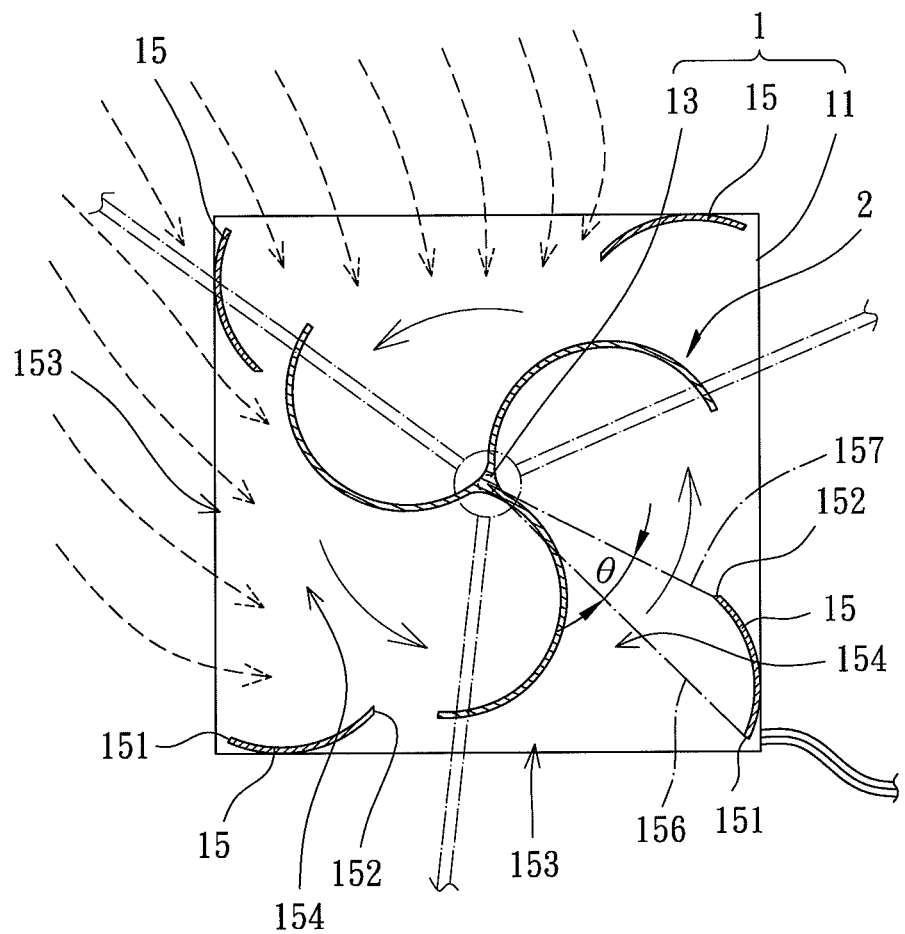
FIG. 4 shows an operation view of the wind power turbine according to the preferred embodiment of the invention.

Referring to FIGS. 3 and 4, when the wind blowing over the drag-type fan unit 2 and the lift-type fan unit 3 is at a low speed, the drag-type blades 21 may be driven easily due to the small starting torque thereof. Based on this, the drag-type blades 21 may drive the lift-type blades 33 to rotate. Furthermore, when the wind blows through the drag-type blades 21, a larger forward rotation torque is generated. This is because the air inlet 153 between two adjacent air-guiding plates 15 is wider than the air outlet 154, and the wind blows through the wind power turbine from the air inlet 153 to the air outlet 154, allowing the wind to concentrate blowing onto the windward faces 211 of the drag-type blades 21. In addition, the air-guiding plates 15 may stop the wind from directly blowing onto the leeward faces 212 of the drag-type blades 21, and the portion of the wind that is blocked by the air-guiding plates 15 may be guided to the windward faces 211 of the adjacent drag-type blades 21. In this way, smaller reversed rotation torque is generated, resulting in a larger wind power conversion rate.

When the drag-type fan unit 2 and the lift-type fan unit 3 are driven to rotate by a strong wind, the lift-type fan unit 3 may improve the electricity generating efficiency since the lift-type fan unit 3 has a larger torque. In addition, since the inner face 332 and the outer face 333 are asymmetric, the wind passing through the outer face 333 will have a higher speed than the wind passing through the inner face 332. In this way, a larger difference of wind speed is generated, thereby increasing the rotation torque of the lift-type fan unit 3 for better electricity generating efficiency.

Although the invention has been described in detail with reference to its presently preferable embodiment, it will be understood by one of ordinary skill in the art that various modifications can be made without departing from the spirit and the scope of the invention, as set forth in the appended claims.

What is claimed is:

1. A wind power turbine, comprising:
   a frame having a base, a shaft, an electricity generator and a plurality of air-guiding plates, wherein the air-guiding plates are disposed on the base, and the electricity generator is supported by the base, and the shaft has one end connected to the electricity generator;

a drag-type fan unit having a plurality of drag-type blades coupled to an outer circumference of the shaft; and a lift-type fan unit having a plurality of lift-type blades disposed around the drag-type blades, wherein the lift-type blades are coupled to the other end of the shaft;

wherein the drag-type blades are surrounded by the air-guiding plates, each of the air-guiding plates has a first side and a second side, the first and second sides are parallel to the shaft, an air inlet is formed between the first sides of adjacent two of the air-guiding plates, an air outlet is formed between the second sides of adjacent two of the air-guiding plates, and the air inlet is larger than the air outlet.

2. The wind power turbine as claimed in claim 1, wherein the distance between the first side and the shaft is greater than that between the second side and the shaft for each of the air-guiding plates.

3. The wind power turbine as claimed in claim 1, wherein a first plane is defined between a center of the shaft and the first side, a second plane is defined between the center of the shaft and the second side, and an included angle is formed between the first and second planes for each of the air-guiding plates.

4. The wind power turbine as claimed in claim 3, wherein the included angle is between 10 to 30 degrees.

5. The wind power turbine as claimed in claim 4, wherein the included angle is 20 degrees.

6. The wind power turbine as claimed in claim 3, wherein each of the lift-type blades has a central line extending therethrough in a radial direction of the shaft, the central line splits the each of the lift-type blades into an inner face and an outer face, both the inner face and the outer face are cambered, and a maximal radial distance from the shaft to the outer face is larger than a maximal radial distance from the shaft to the inner face.

7. The wind power turbine as claimed in claim 6, wherein the inner face faces the shaft.

8. The wind power turbine as claimed in claim 7, wherein the lift-type fan unit further includes a plurality of supporting rods, each of the supporting rods has one end coupled with the other end of the shaft, and extends outwards in the radial direction of the shaft, and the lift-type blades are coupled with the other ends of the supporting rods.

9. The wind power turbine as claimed in claim 8, wherein the central line is perpendicular to the supporting rods.

10. The wind power turbine as claimed in claim 1, wherein the air-guiding plates are in the form of a flat plate or a cambered plate.

11. The wind power turbine as claimed in claim 1, wherein each of the lift-type blades has a central line extending therethrough in a radial direction of the shaft, the central line splits the each of the lift-type blades into an inner face and an outer face, both the inner face and the outer face are cambered, and a maximal radial distance from the shaft to the outer face is larger than a maximal radial distance from the shaft to the inner face for each of the lift-type blades.

12. The wind power turbine as claimed in claim 11, wherein the inner face faces the shaft.

13. The wind power turbine as claimed in claim 12, wherein the lift-type fan unit further includes a plurality of supporting rods, each of the supporting rods has one end coupled with the other end of the shaft and extends outwards in the radial direction of the shaft, and the lift-type blades are coupled with the other ends of the supporting rods.

14. The wind power turbine as claimed in claim 13, wherein the central line is perpendicular to the supporting rods.

15. The wind power turbine as claimed in claim 1, wherein the other end of the shaft extends through a top plate of the frame to form an assembling portion, and the lift-type blades are supported by the assembling portion.

16. The wind power turbine as claimed in claim 15, wherein the air-guiding plates are disposed at corners of a space between the base and the top plate.

17. The wind power turbine as claimed in claim 1, wherein each of the drag-type blades has a windward face and a leeward face, and the windward face of one of the drag-type blades faces the leeward face of another adjacent one of the drag-type blades.

18. The wind power turbine as claimed in claim 17, wherein the windward face is a cambered concave face and the leeward face is a cambered convex face.

* * * * *